(12) United States Patent
Kosaka

(10) Patent No.: US 8,907,240 B2
(45) Date of Patent: Dec. 9, 2014

(54) IN-VEHICLE LEVER SWITCH DEVICE

(71) Applicant: Bayerische Motoren Werke Aktiengesellschaft, Munich (DE)

(72) Inventor: Ken Kosaka, Miyagi-Ken (JP)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 122 days.

(21) Appl. No.: 13/765,180

(22) Filed: Feb. 12, 2013

(65) Prior Publication Data

US 2013/0206551 A1 Aug. 15, 2013

(30) Foreign Application Priority Data

Feb. 15, 2012 (JP) ................. 2012-030928

(51) Int. Cl.
*H01H 5/00* (2006.01)
*H01H 25/06* (2006.01)
*B60Q 1/14* (2006.01)

(52) U.S. Cl.
CPC ........... *H01H 25/065* (2013.01); *B60Q 1/1476* (2013.01)
USPC ...................................... 200/400

(58) Field of Classification Search
CPC ... H01H 25/06; H01H 25/065; H01H 25/008; H01H 25/041; H01H 13/70; H01H 2300/008; H01H 9/26; H01H 19/14
USPC ......... 200/5 A, 4, 17 R, 11 D, 14, 18, 11 DA, 200/243, 281, 545, 548, 550, 551, 553, 559, 200/329, 330
See application file for complete search history.

(56) References Cited

U.S. PATENT DOCUMENTS

| | | | | |
|---|---|---|---|---|
| 6,080,942 A | * | 6/2000 | Sasaki ......................... | 200/17 R |
| 8,400,333 B2 | * | 3/2013 | Ishikawa et al. ................ | 341/35 |
| 2011/0308927 A1 | * | 12/2011 | Yang et al. .................... | 200/5 A |

FOREIGN PATENT DOCUMENTS

JP 2009-200018 9/2009

* cited by examiner

*Primary Examiner* — Edwin A. Leon
(74) *Attorney, Agent, or Firm* — Crowell & Moring LLP

(57) ABSTRACT

A holder incorporated in and fixed to cylindrical lever body rotatably supports a rotating knob, and the rotating knob supports a pressing knob so as to be able to reciprocate in the axial direction. Any of these cylindrical lever body, the rotating knob and the pressing knob has a non-circular outline along an orthogonal plane which is orthogonal to the axial direction. The rotating knob is arranged in the vicinity of the distal end of the cylindrical lever body, and the rotating knob opposes a main surface of a circuit board mounted on the holder. The main surface of the circuit board includes a push switch having a contact pattern which can be connected to and disconnected from a slider attached to the rotating knob, and a driven part thrust by a drive rod of the pressing knob during a pressing operation.

5 Claims, 12 Drawing Sheets

IN-VEHICLE LEVER SWITCH DEVICE

CLAIM OF PRIORITY

This application claims benefit of Japanese Patent Application No. 2012-030928 filed on Feb. 15, 2012, which is hereby incorporated by reference in its entirety.

BACKGROUND

1. Field of the Disclosure

The present disclosure relates to an in-vehicle lever switch device used as a turn signal switch, a wiper switch or the like for vehicles and in particular to an in-vehicle lever switch device having a rotating knob and a pressing knob in the vicinity of the distal end of a cylindrical lever body capable of a swing operation.

2. Description of the Related Art

Such a type of in-vehicle lever switch device allows a cylindrical lever body to protrude from a housing fixed to a steering column and the like, is capable of a swing operation within two operating surfaces which are substantially orthogonal to each other, and a rotating knob and a pressing knob exposed in the vicinity of the distal end of the cylindrical lever body are respectively and independently operable. Then, the swing operation with respect to the cylindrical lever body enables a turn signal switch or a wiper switch to be turned on, for example. In addition, through a rotating operation of the rotating knob along the plane orthogonal to the axial direction of the cylindrical lever body or through a pressing operation of the pressing knob along the axial direction, it is possible to turn on a fog lamp switch or a rear wiper switch. If the rotating knob and the pressing knob are arranged in the vicinity of the distal end of the cylindrical lever body in this manner, multiple types of accurate input operation can be easily performed and thereby multiple functions of the lever switch device can be easily achieved.

Generally, in such a type of in-vehicle lever switch device, the outline of the cylindrical lever body is substantially circular when viewed in a cross section, and the outline of the rotating knob or the pressing knob is also substantially circular in a cross-sectional view (for example, Japanese Unexamined Patent Application Publication No. 2009-200018). A support member is integrally mounted on the cylindrical lever body and the support member supports the rotating knob or the pressing knob in a state where the respective operations thereof are available. That is, one or two support members fixed to the cylindrical lever body restrain the reciprocation while rotatably supporting the rotating knob and restrain the rotation while supporting the pressing knob to enable the reciprocation. In addition, a rotary switch mechanism capable of detecting the rotating operation with respect to the rotating knob, a push switch mechanism (or a slide switch mechanism) capable of detecting the pressing operation with respect to the pressing knob or the like is incorporated in the cylindrical lever body.

Incidentally, from a different viewpoint owing to an enhanced design of an in-vehicle lever switch device, it has been recently required that the outline of cylindrical lever body, a rotating knob and a pressing knob exposed in the vicinity of the distal end is configured to be non-circular (for example, a flat shape) when viewed in a cross section. However, such a configuration has not yet been put to practical use.

SUMMARY

The in-vehicle lever switch device of the present invention is configured such that in the vicinity of the distal end of cylindrical lever body, a rotating knob that can be rotated along an orthogonal plane which is orthogonal to the axial direction of the cylindrical lever body and a pressing knob that can reciprocate along the axial direction by being loosely fitted to the rotating knob are arranged. The outlines along the orthogonal plane of the cylindrical lever body, the rotating knob and the pressing knob are non-circular. A holder incorporated in and fixed to the cylindrical lever body and a circuit board mounted on the holder in a posture along the orthogonal plane are provided. The rotating knob is rotatably supported by the holder and the pressing knob is supported by the rotating knob in a state where the pressing knob can reciprocate and the rotation is restrained. A rotating detection part and a pressing detection part are provided on one main surface of the circuit board, which faces the distal end side of the cylindrical lever body, such that a rotating operation with respect to the rotating knob is detected by the rotating detection part and a pressing operation with respect to the pressing knob is detected by the pressing detection part.

According to this configuration, it is possible to mount the rotating knob and the pressing knob whose cross-sectional shapes are non-circular in the vicinity of the distal end of the cylindrical lever body whose cross-sectional shape is non-circular. In addition, the in-vehicle lever switch device excellent in design can be provided. Furthermore, if one holder rotatably supporting the rotating knob is mounted on the cylindrical lever body, the pressing knob is also supported at a predetermined position. And then, if the circuit board is mounted on the holder, the main surface of the circuit board on which the rotating detection part and the pressing detection part are provided is allowed to oppose the rotating knob and the pressing knob. Therefore, easy assembly and a less number of components may be realized.

DESCRIPTION OF THE EXEMPLARY EMBODIMENTS

Figure 1:
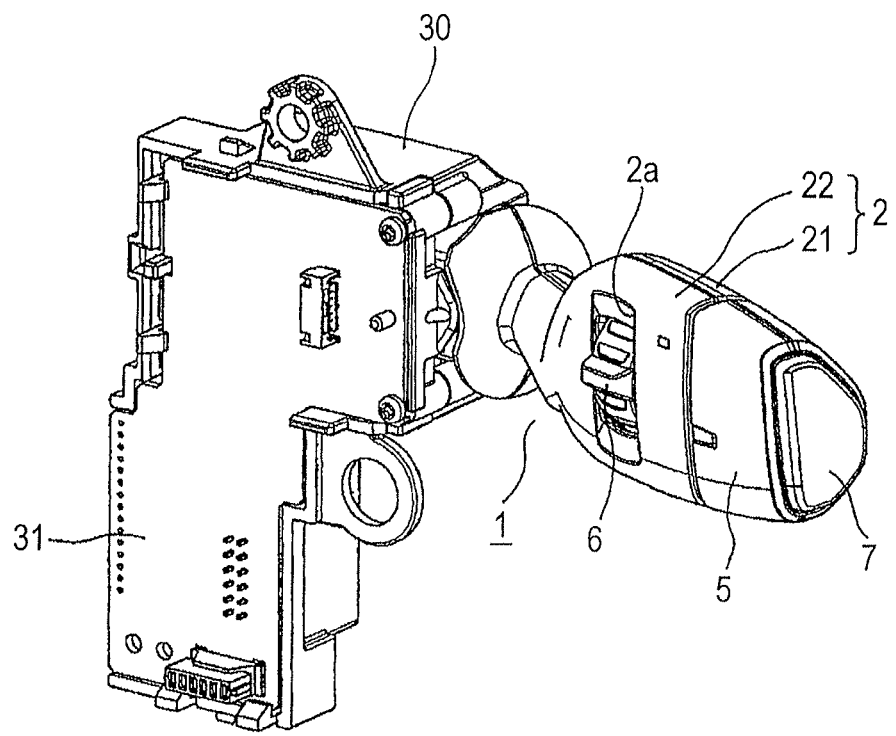
FIG. 1 is a perspective view illustrating a mounting state of an in-vehicle lever switch device according to an embodiment of the present invention.
Figure 2:
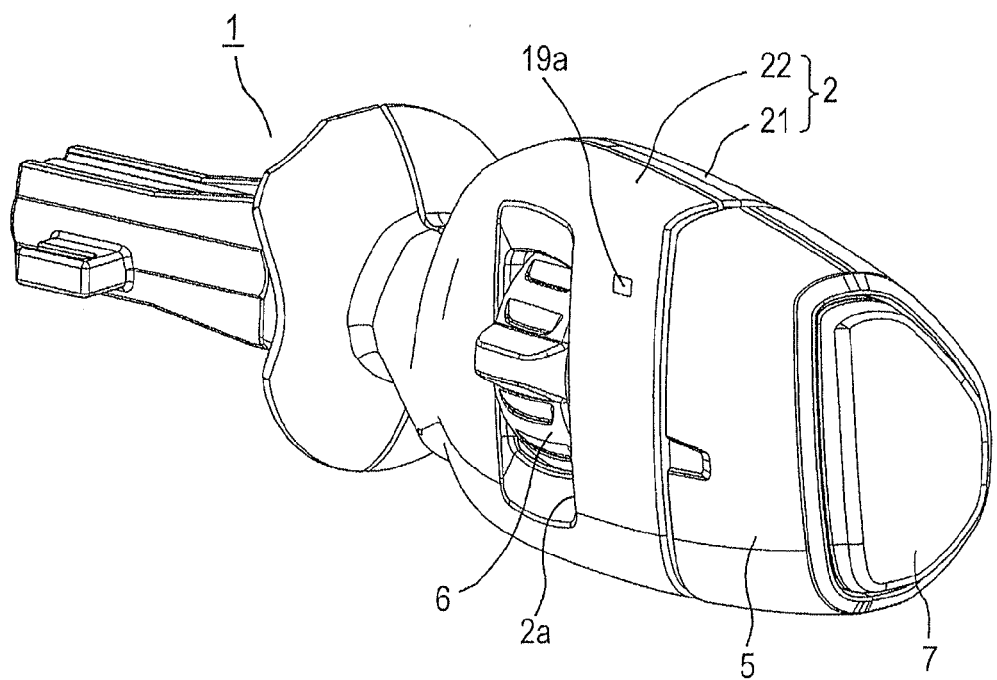
FIG. 2 is a perspective view illustrating an outer shape of the lever switch device.
Figure 3:
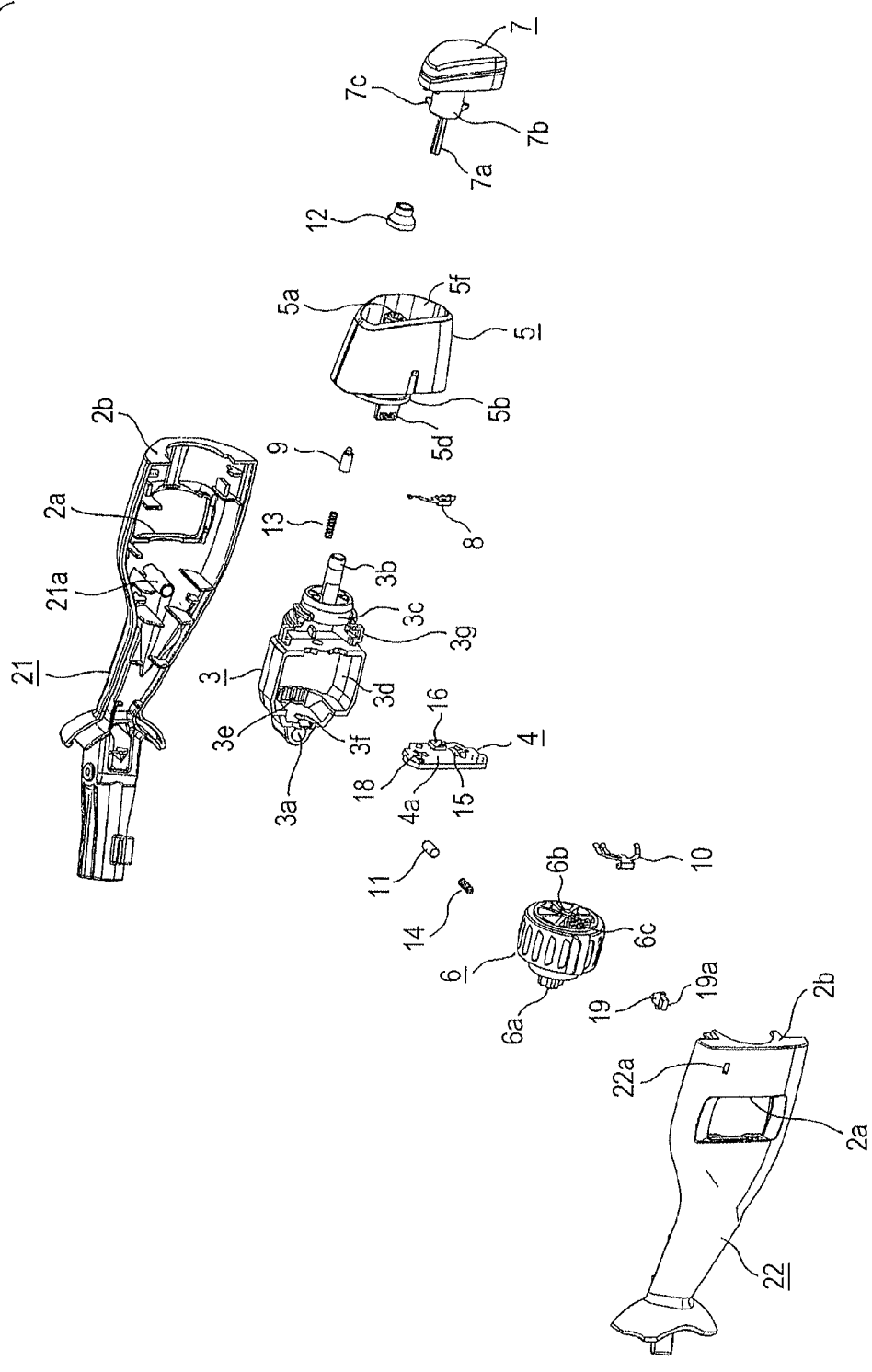
FIG. 3 is an exploded perspective view of the lever switch device.
Figure 4:
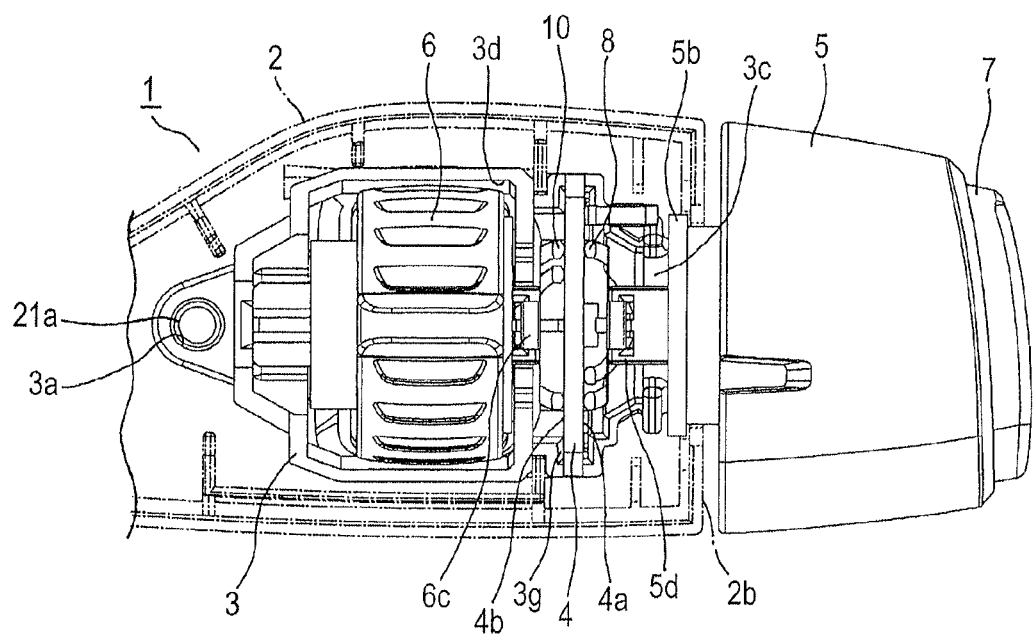
FIG. 4 is a front view illustrating the lever switch device partially omitted.

Hereinafter, embodiments of the present invention will be described with reference to the accompanying drawings. As illustrated in FIG. 1, an in-vehicle lever switch device 1 according to the present embodiment is designed as a lever switch device which protrudes to the right from a housing 30 fixed to a steering column and the like, but it may be the one which protrudes to the left from the housing 30. In addition, a main board 31 is fixed to the housing 30, and circuit components or connectors provided on the main board 31 and the lever switch device 1 are electrically connected to each other.

As illustrated in FIGS. 1 to 8, the in-vehicle lever switch device 1 according to the present embodiment is mainly configured by cylindrical lever body 2 formed in combination with a pair of levers 21 and 22 in a half-divided shape; a holder 3 which is incorporated in and fixed to the cylindrical lever body 2; a circuit board 4 mounted on the holder 3; a first rotating knob 5 and a second rotating knob 6 which are rotatably supported by the holder 3; a pressing knob 7 which is supported by the first rotating knob 5 so as to be capable of reciprocating; a slider 8 for the first rotating knob 5 or an engaging/disengaging member 9; a slider 10 for the second rotating knob 6 or an engaging/disengaging member 11; and a rubber body 12 for the pressing knob 7.

The cylindrical lever body 2 is capable of a swing operation within two operation surfaces where the cylindrical lever body 2 are substantially orthogonal to each other. In the outlines of the cylindrical lever body 2, the first rotating knob 5 and the pressing knob 7, the cross-sectional shapes along the orthogonal plane which is orthogonal to the axial direction are formed to be non-circular, that is, formed in a rounded trapezoid shape in view of an enhanced design. Consequently, the outline of the first rotating knob 5 is not point-symmetrical with respect to the center line of rotation. However, since the second rotating knob 6 has only a portion of the outer surface exposed from window parts 2a provided on the cylindrical lever body 2, the outline of the second rotating knob 6 is substantially point-symmetrical with respect to the center line of rotation. The window parts 2a are respectively formed at the distal end side of a pair of the lever bodies 21 and 22 in a half-divided shape, which is a configuring element of the cylindrical lever body 2. A mounting boss 21a is protruded for positioning and holding the holder 3 on the inner wall of one lever body 21. In addition, the other lever body 22 has a fitting hole 22a for mounting a light guide body 19 (refer to FIG. 9), and the end surface of the light guide body 19 exposed to the fitting hole 22a forms an illumination part 19a which can be illuminated by a light source 18 (to be described later).

The holder 3 is incorporated in the internal space of the distal end side of the cylindrical lever body 2. More specifically, the mounting boss 21a provided inside the lever body 21 is inserted to the fitting hole 3a of the holder 3, the holder 3, being positioned, is mounted on the inner wall portion of the lever body 21, and then a pair of the lever bodies 21 and 22 is fitted together by means of snap coupling and the like. In this manner, the cylindrical lever body 2 with the holder 3 are assembled.

The holder 3 includes a guide shaft part 3b in an elongated cylinder shape, which protrudes from a distal end surface 2b of the cylindrical lever body 2 and inserted into the first rotating knob 5; a guide wall part 3c which is arranged in the vicinity of the distal end surface 2b inside the cylindrical lever body 2 and which has a cylindrical shape; a knob storing part 3d in which the second rotating knob 6 is stored; a cam surface 3e which continuously has a partial concave and convex portion on the inner wall surface facing the knob storing part 3d; a pair of bearing parts 3f to which shaft parts 6a and 6b of the second rotating knob 6 are inserted; a board mounting part 3g into which the circuit board 4 is press-fitted; and a first storing part 3h (refer to FIG. 8) in which the engaging/disengaging member 9 for the first rotating knob 5 and a coil spring 13 are stored. The center line on the elongated cylindrical surface of a guide shaft part 3b matches with the center line on the cylindrical surface of the guide wall part 3c or the center line of the shaft holes of the respective bearing parts 3f. In addition, a drive rod 7a of the pressing knob 7 is inserted to the guide shaft part 3b.

Figure 5:
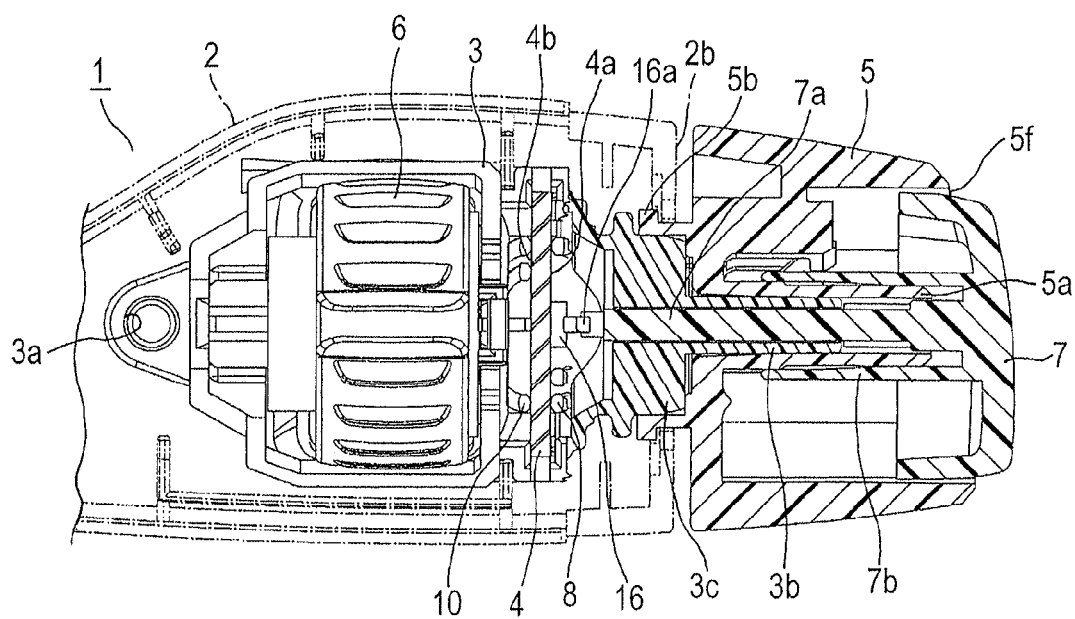
FIG. 5 is a partial cross-sectional view corresponding to FIG. 4.
Figure 6:
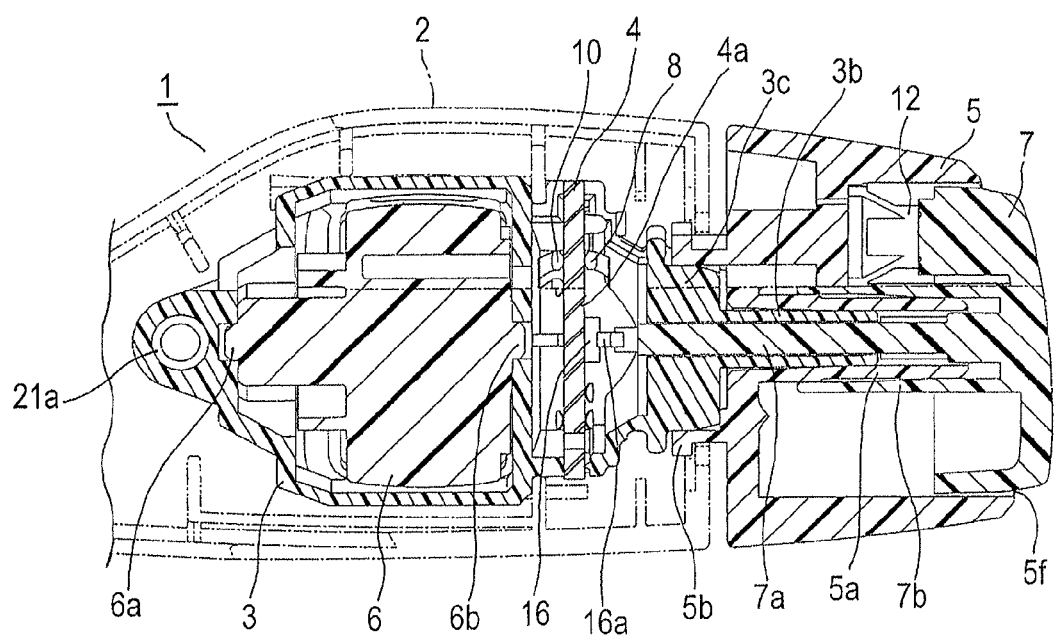
FIG. 6 is a longitudinal cross-sectional view of the lever switch device.
Figure 7:
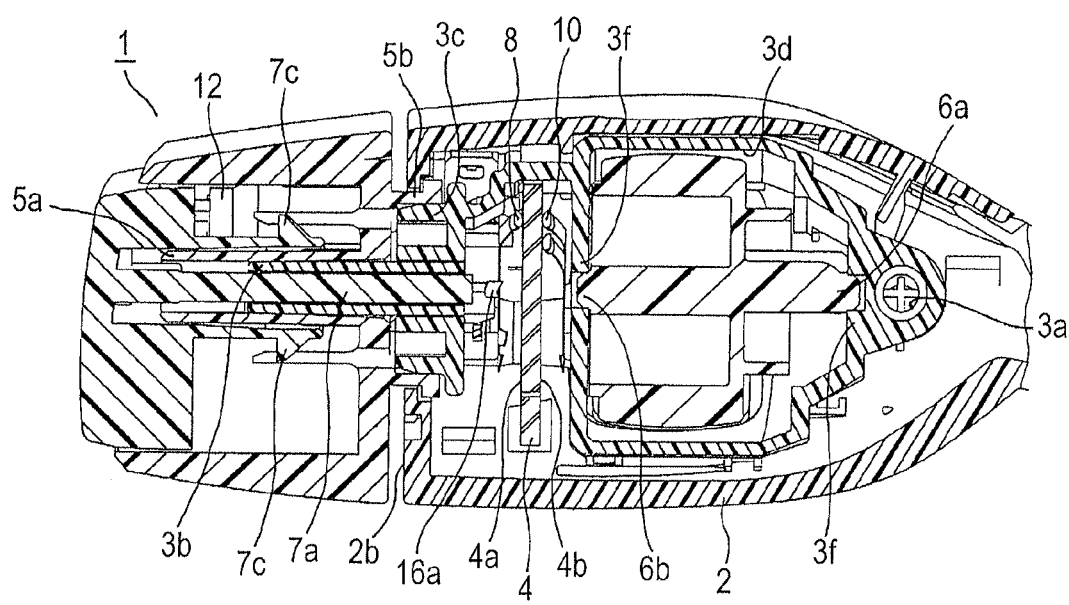
FIG. 7 is a longitudinal cross-sectional view viewed from the rear surface side of FIG. 6 by the lever switch device broken at a different position from FIG. 6.
Figure 8:
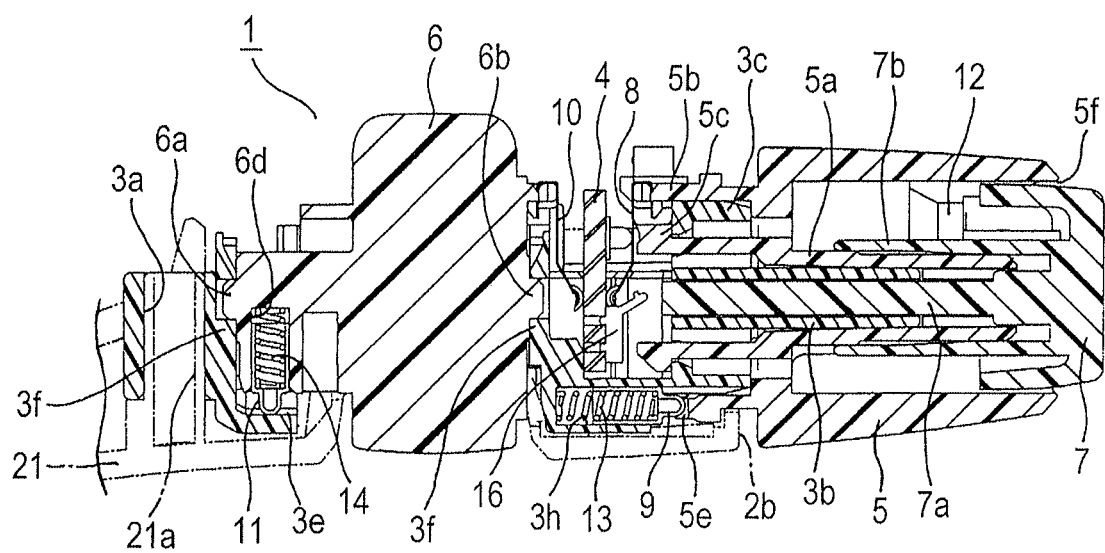
FIG. 8 is a cross-sectional view illustrating the lever switch device partially omitted.

The first rotating knob 5 includes an inner cylinder engaging part 5a (refer to FIG. 5) which allows the guide shaft part 3b to be slidably inserted; an outer cylinder engaging part 5b which is inserted into the cylindrical lever body 2 and allows the guide wall part 3c to be slidably inserted; a retaining hook 5c (refer to FIG. 8) which is sealable by the end surface of the base end side of the guide wall part 3c; a slider mounting part 5d (refer to FIG. 4) on which a slider 8, a movable contact, is mounted; a cam surface 5e (refer to FIG. 8) which has a consecutive partial concave and convex portion on the end surface of the base end side of the outer cylinder engaging part 5b; and an opening end 5f to which the pressing knob 7 is loosely fitted. As illustrated in FIG. 5, the first rotating knob 5 is rotatably supported by the guide shaft part 3b and the guide wall part 3c of the holder 3. If the first rotating knob 5 is mounted on the holder 3, the straight line passing through the respective centers of the inner cylinder engaging part 5a and the outer cylinder engaging part 5b becomes the center line of rotation. As illustrated in FIG. 8, the engaging/disengaging member 9 biased by the coil spring 13 comes into elastic contact with the cam surface 5e. In addition, the inner cylinder engaging part 5a of the first rotating knob 5 supports a cylindrical body 7b of the pressing knob 7 so as to be capable of reciprocating along the center line of rotation. Then, by incorporating the holder 3 in the cylindrical lever body 2, the first rotating knob 5 is arranged in the vicinity of the distal end surface 2b of the cylindrical lever body 2, and the first rotating knob 5 exposed to the further distal end side in the axial direction than the cylindrical lever body 2 becomes capable of the rotating operation along the orthogonal plane which is orthogonal to the axial direction.

The second rotating knob 6 includes shaft parts 6a and 6b pivotally supported by a pair of the bearing parts 3f of the holder 3; a slider mounting part 6c on which the slider 10, the movable contact, is mounted; and a second storing part 6d (refer to FIG. 8) in which the engaging/disengaging member 11 and a coil spring 14 are stored. The second rotating knob 6 is stored in the knob storing part 3d of the holder 3, and is rotatably supported by a pair of the bearing parts 3f. The straight line passing through the respective centers of the shaft parts 6a and 6b becomes the center line of rotation. If the second rotating knob 6 is mounted on the holder 3, the shaft parts 6a and 6b are arranged on the extension line of the guide shaft part 3b, and the engaging/disengaging member 11 biased by the coil spring 14 comes into elastic contact with the cam surface 3e of the holder 3. Then, by incorporating the holder 3 in the cylindrical lever body 2, the second rotating knob 6 is arranged at the distal end side inside the cylindrical lever body 2, and the second rotating knob 6 exposed from the window part 2a of the cylindrical lever body 2 becomes capable of the rotating operation along the orthogonal plane which is orthogonal to the axial direction.

The pressing knob 7 includes a drive rod 7a which penetrates the inside of the inner cylinder engaging part 5a of the first rotating knob 5 and the inside of the guide shaft part 3b of the holder 3 and is extended to the base end side of the first rotating knob 5 in the axial direction; a cylindrical body 7b which allows the inner cylinder engaging part 5a to be slidably inserted; and a regulating hook 7c which protrudes outward in the radial direction from the outer peripheral surface of the cylindrical body 7b. The pressing knob 7 is mounted on the first rotating knob 5 in a state of being loosely fitted to the opening end 5f, and the drive rod 7a is extended, being overlapped with the center line of rotation of the first rotating knob 5. Then, if the first rotating knob 5 is mounted on the holder 3, the distal end portion of the drive rod 7a is arranged at the position where a driven part 16a of a push switch 16 mounted on the circuit board 4 can be thrust (refer to FIG. 6). In addition, the cylindrical body 7b can reciprocate in the direction along the center line of rotation of the first rotating knob 5, with respect to the outer peripheral surface of the inner cylinder engaging part 5a, but the regulating hook 7c is engaged with the inner wall portion of the first rotating knob 5 in order to prevent the rotation and dropout of the cylindrical body 7b (refer to FIG. 7). In other words, the pressing knob 7 is mounted in a state where the pressing knob 7, being retained, can reciprocate with respect to the first rotating knob 5 and can be also integrally rotated. Then, if the holder 3 is incorporated in the cylindrical lever body 2, the pressing knob 7 exposed to the opening end 5f of the first rotating knob 5 becomes capable of the pressing operation toward the base end side of the first rotating knob 5 in the axial direction. Thus, the pressing knob 7 is also integrally rotated during the rotating operation of the first rotating knob 5.

Figure 9:
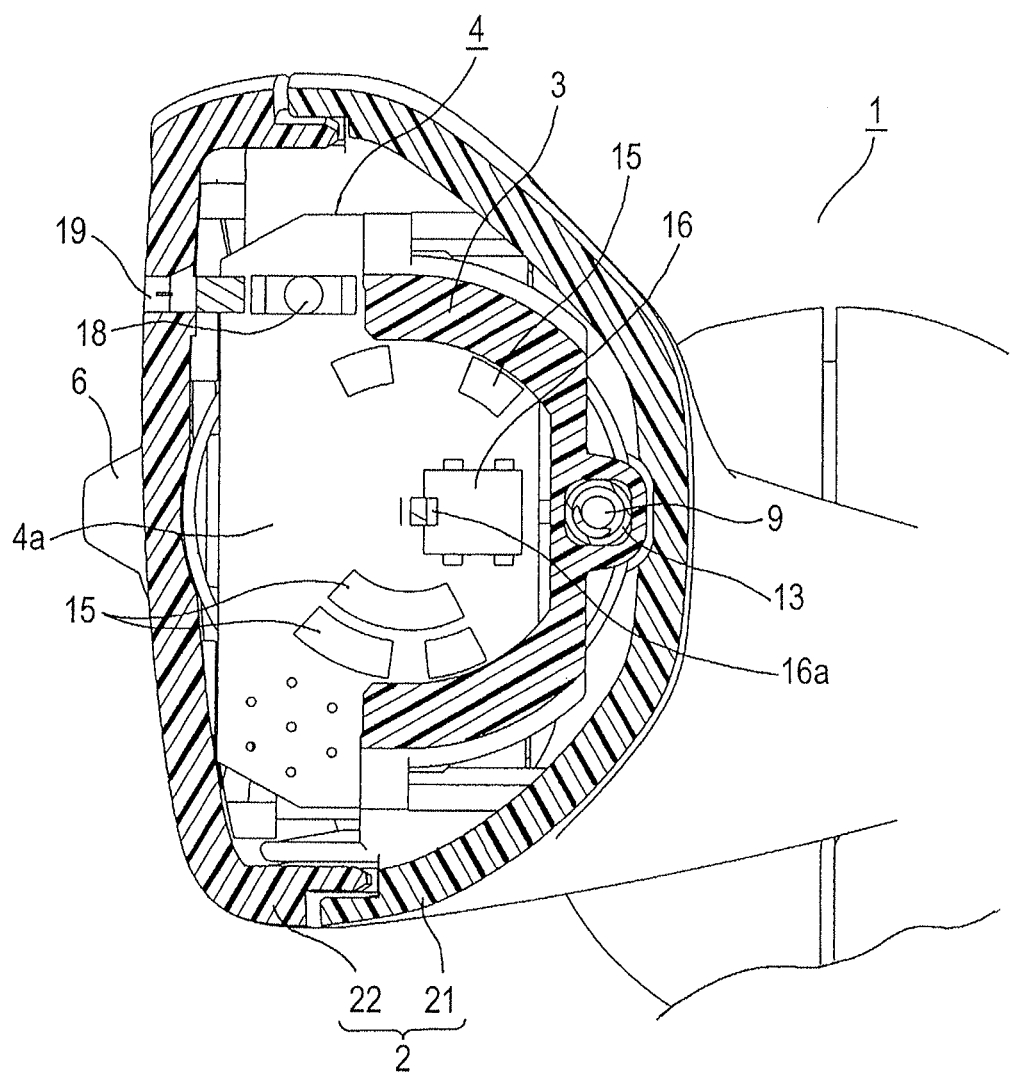
FIG. 9 is an explanatory diagram illustrating one main surface of a circuit board mounted on a holder of the lever switch device.
Figure 12:
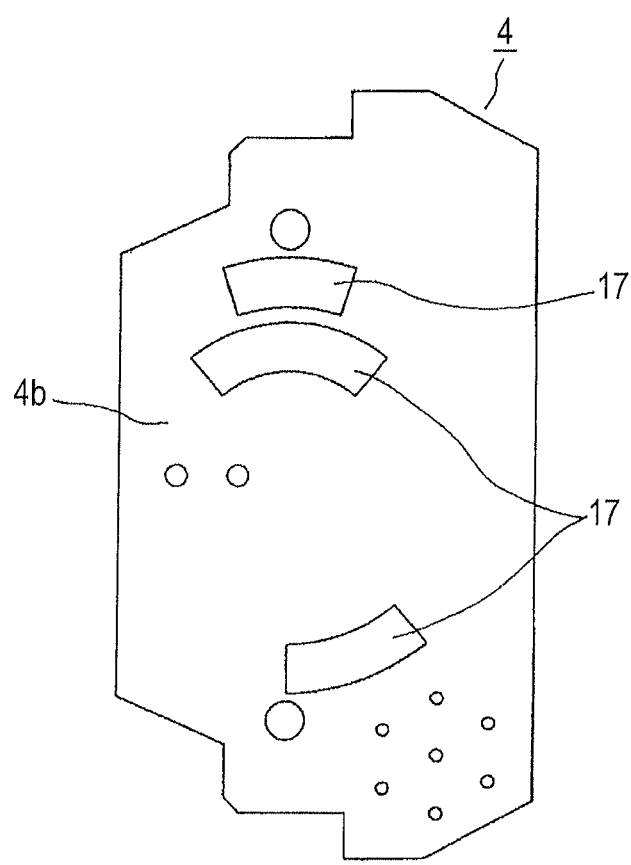
FIG. 12 is an explanatory diagram illustrating the other main surface of the circuit board.

The circuit board 4 is press-fitted into the board mounting part 3g of the holder 3, and by incorporating the holder 3 in the cylindrical lever body 2, both main surfaces 4a and 4b of the circuit board 4 are arranged along the orthogonal plane which is orthogonal to the axial direction of the cylindrical lever body 2. That is, the circuit board 4 is fixed to the holder 3 and the cylindrical lever body 2 in a posture where one main surface 4a faces the distal end side in the axial direction of the cylindrical lever body 2 and the other main surface 4b faces the base end side in the axial direction. As illustrated in FIG. 9, on one main surface 4a of the circuit board 4, a first contact pattern 15 is formed as a rotating detection part (first rotating detection part) for the first rotating knob 5, and the push switch 16 is mounted as a pressing detection part for the pressing knob 7. The push switch 16 is a well-known one which has the driven part 16a referred to as a stem or the like, and which is turned on by an operation if the driven part 16a is thrust with a predetermined stroke. In addition, as illustrated in FIG. 12, on the other main surface 4b of the circuit board 4, a second contact pattern 17 is formed as a rotating detection part (second rotating detection part) for the second rotating knob 6. Furthermore, the light source 18 such as an LED is mounted on the main surface 4a of the circuit board 4, and by light from the light source 18 being incident on the light guide body 19, the illumination part 19a illuminates.

Figure 11:
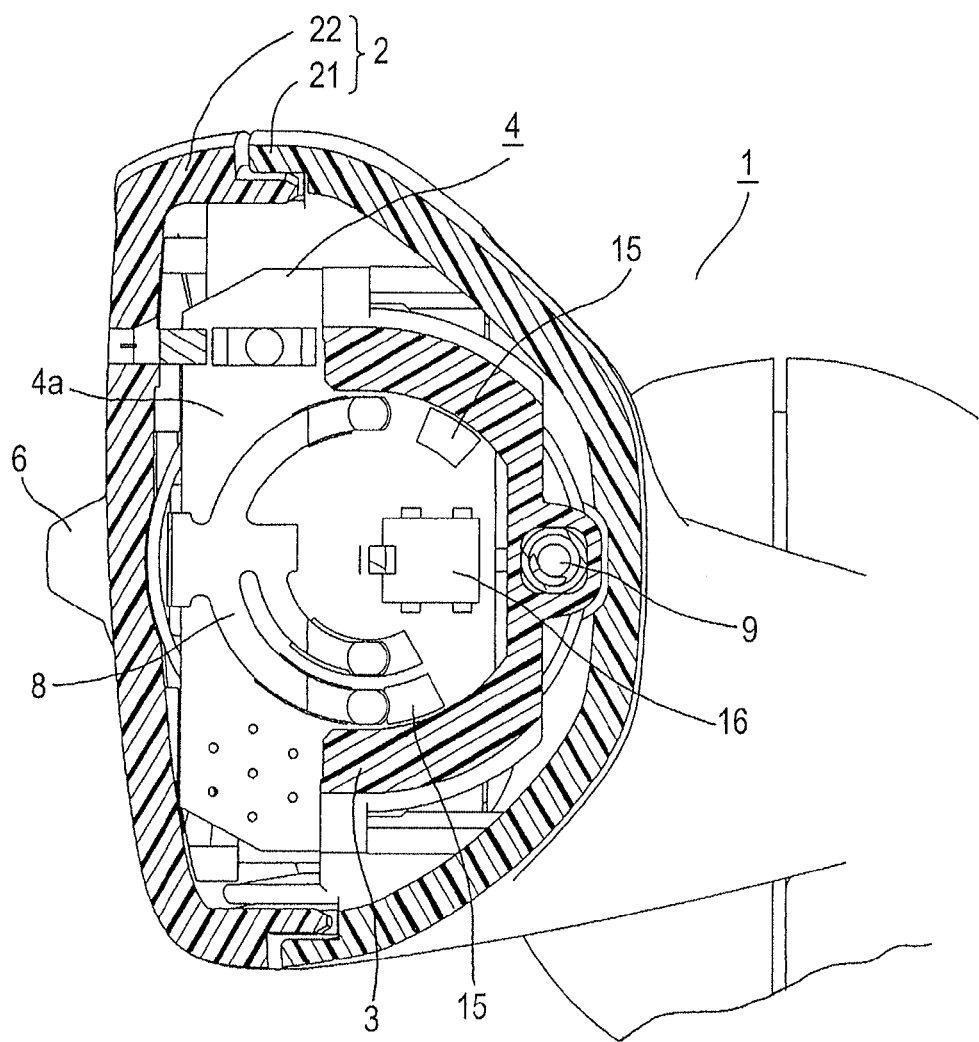
FIG. 11 is an explanatory diagram illustrating that a movable contact mounted on the first rotating knob is added to FIG. 9.

As illustrated in FIG. 11, if the slider 8 mounted on the slider mounting part 5d of the first rotating knob 5 is slidably in elastic contact with the main surface 4a of the circuit board 4 and the first rotating knob 5 is operated to rotate, the slider 8 is connected to and disconnected from the first contact pattern 15. Likewise, if the slider 10 mounted on the slider mounting part 6c of the second rotating knob 6 is slidably in elastic contact with the other main surface 4b (refer to FIG. 12) of the circuit board 4 and the second rotating knob 6 is operated to rotate, the slider 10 is connected to and disconnected from the second contact pattern 17. In addition, as described above, if the distal end portion of the drive rod 7a of the pressing knob 7 is arranged at the position opposing the driven part 16a of the push switch 16 and the pressing knob 7 is operated to press, the drive rod 7a thrust the driven part 16a to turn on the push switch 16 for operation. Here, the driven part 16a and the push switch 16 configure the pressing detection part.

The rubber body 12 is an elastically molded product with a dome shape. The rubber body 12 is assembled in a place facing the opening end 5f inside the first rotating knob 5 and causes the pressing knob 7 to be elastically biased in the opposite direction to the pressing operation direction (refer to FIG. 6). Therefore, the pressing knob 7 is operated to press while elastically deforming the rubber body 12, and the pressing knob 7 after the pressing operation, can be caused to automatically return to its original position by the elastic restoring force of the rubber body 12. In addition, if the pressing knob 7 is operated to press, the rubber body 12 is elastically buckled so as to impart a feeling of a click in an appropriate timing and immediately thereafter the push switch 16 is designed to be turned on by the operation.

Next, an operation of the in-vehicle lever switch device 1 configured as above will be described. A user performs the swing operation with respect to the cylindrical lever body 2 and thereby can selectively turn on a wiper switch, a turn signal switch or the like for an operation, for example. However, since an operation mechanism in the swing operation of the cylindrical lever body 2 does not directly relate to the present invention, the description thereof will be omitted.

Figure 10:
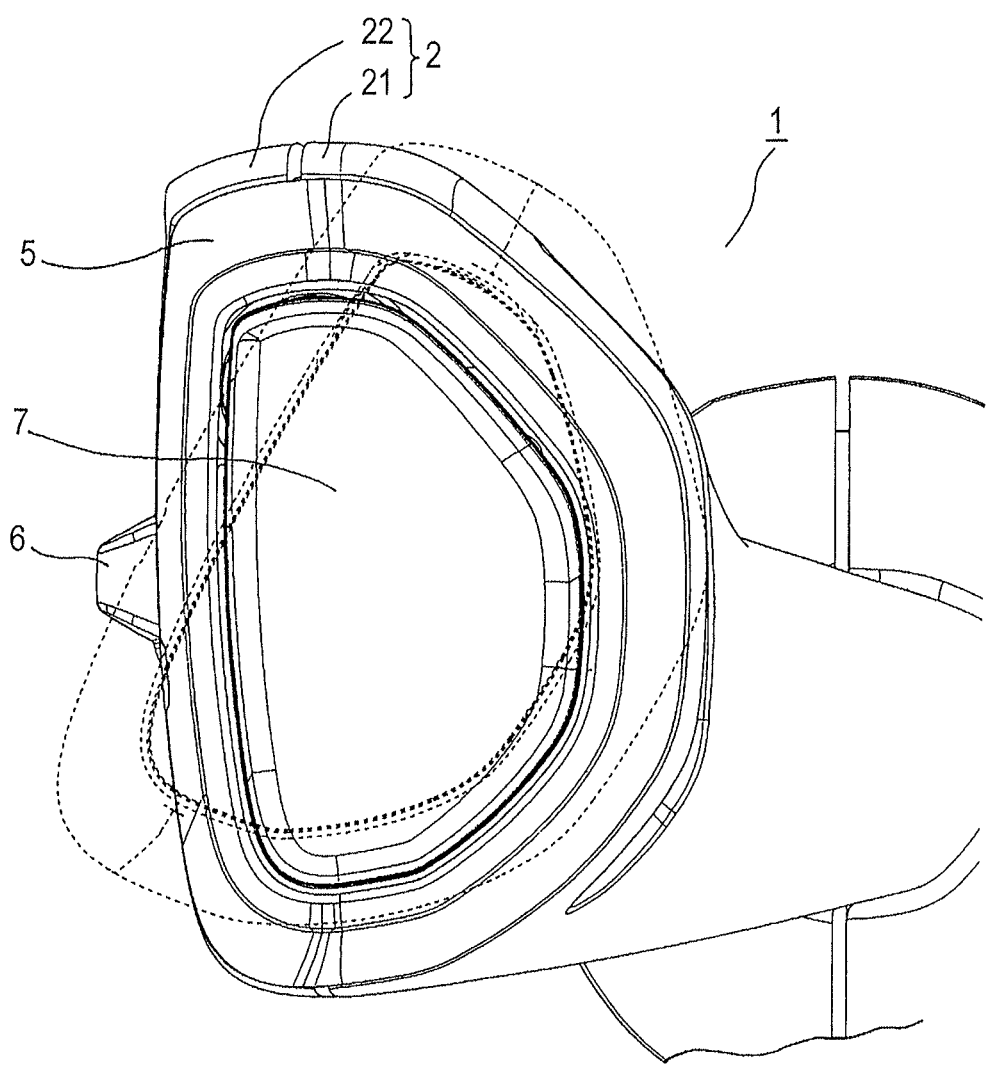
FIG. 10 is an explanatory diagram illustrating a first rotating knob and a pressing knob which are present in the distal end portion of the lever switch device.

First, the operation in a case where the user operates the first rotating knob 5 to rotate will be described. The inner cylinder engaging part 5a and the outer cylinder engaging part 5b of the first rotating knob 5 are respectively and rotatably supported by the guide shaft part 3b and the guide wall part 3c of the holder 3. Accordingly, the first rotating knob 5 exposed to the further distal end side in the axial direction than the cylindrical lever body 2 has a stable posture, and thus there is no possibility that the center line of rotation is inclined with respect to the axial direction of the cylindrical lever body 2. Therefore, the user can rotate the first rotating knob 5 forward and backward along the orthogonal plane which is orthogonal to the axial direction of the cylindrical lever body 2. At this time, as illustrated by the dashed line in FIG. 10, the pressing knob 7 is also rotated together with the first rotating knob 5. The slider 8 attached to the first rotating knob 5 is in elastic contact with the main surface 4a of the circuit board 4 and the first contact pattern 15 as illustrated in FIG. 9 is provided on the main surface 4a. FIG. 11 illustrates a positional relation of the slider 8 with respect to the first contact pattern 15 when the first rotating knob 5 is located at an OFF position. Since a contact position of the slider 8 with respect to the first contact pattern 15 is changed in response to the rotation of the first rotating knob 5, it is possible to output a plurality of operation signals in accordance with positions of the rotating operation. In addition, if the first rotating knob 5 having the cam surface 5e is rotated, the engaging/disengaging member 9 held in the holder 3 is engaged with and disengaged from the concave and convex portion of the cam surface 5e. Accordingly, the feeling of a click is imparted during the engaging and disengaging and the first rotating knob 5 can be positioned and held at the position of the respective rotating operations. Therefore, the user can accurately perform the rotating operation to set the first rotating knob 5 at a desired position of the rotating operation.

Furthermore, if the first rotating knob 5 is operated to rotate from the OFF position, the light source 18 is turned on, the illumination part 19a of the light guide body 19 illuminates. If the first rotating knob 5 returns to the OFF position, the light source 18 is configured to be turned off. In addition, in the present embodiment, the rotating operation of the first rotating knob 5 enables the switching on/off or the selection of operation speed for a rear wiper. However, the use of the first rotating knob 5 is not limited thereto.

Next, the operation in a case where the user operates to rotate the second rotating knob 6 will be described. Since the shaft parts 6a and 6b of the second rotating knob 6 are rotatably supported by a pair of the bearing parts 3f of the holder 3, the user can rotate the second rotating knob 6 exposed from the window part 2a of the cylindrical lever body 2 forward and backward along the orthogonal plane which is orthogonal to the axial direction. The slider 10 attached to the second rotating knob 6 is in elastic contact with the main surface 4b of the circuit board 4 and the second contact pattern 17 as illustrated in FIG. 12 is provided on the main surface 4b. Since a contact position of the slider 10 with respect to the second contact pattern 17 is changed in response to the rotation of the second rotating knob 6, it is possible to output a plurality of operation signals in accordance with the positions of the rotating operation. In addition, if the second rotating knob 6 holding the engaging/disengaging member 11 is rotated, the engaging/disengaging member 11 is engaged with and disengaged from the concave and convex portion of the cam surface 3e of the holder 3. Accordingly, the feeling of a click is imparted during the engaging and disengaging, and the second rotating knob 6 can be positioned and held at the position of the respective rotating operations. Therefore, the user can accurately perform the rotating operation to set the second rotating knob 6 at a desired position of the rotating operation. Furthermore, in the present embodiment, the rotating operation of the second rotating knob 6 enables a sensitivity control of a rain sensor, but the use of the second rotating knob 6 is not limited thereto.

Next, the operation in a case where the user operates to press the pressing knob 7 will be described. The cylindrical body 7b of the pressing knob 7 is supported by the inner cylinder engaging portion 5a of the first rotating knob 5 so as to be capable of reciprocating. Accordingly, the user can operate to press the pressing knob 7 exposed to the opening end 5f of the first rotating knob 5, toward the base end side in the axial direction. The pressing operation of the pressing knob 7 is performed while the rubber body 12 is elastically deformed. In response to the pressing operation, a driven part 16a of the push switch 16 present on the main surface 4a of the circuit board 4 is thrust by the distal end portion of the drive rod 7a. Then, when the driven part 16a is thrust with a predetermined stroke, the rubber body 12 is elastically buckled, a feeling of a click is imparted and immediately thereafter the push switch 16 is turned on by the operation. In addition, if a pressing operation force is removed with respect to the pressing knob 7, the pressing knob 7 returns to its original position due to the elastic restoring force of the rubber body 12. Accordingly, the driven part 16a automatically is caused to return to the OFF position by a return spring (not illustrated) built in the push switch 16. Further, in the present embodiment, the pressing operation of the pressing knob 7 enables a windshield washer of the rear wiper to be operated, but the use of the pressing knob 7 is not limited thereto.

As described above, in the in-vehicle lever switch device 1 according to the present embodiment, the outlines along the orthogonal plane of the cylindrical lever body 2, the first rotating knob 5 that can be rotated along the orthogonal plane which is orthogonal to the axial direction of the cylindrical lever body 2, and the pressing knob 7 that is loosely fitted to the first rotating knob 5 and can reciprocate along the axial direction are configured to have the non-circular cross-sectional shapes. Then, the circuit board 4 is mounted on the holder 3 fixed to the cylindrical lever body 2 in a posture along the axial direction and the first rotating knob 5 is rotatably supported by the holder 3. Further, the pressing knob 7 is supported by the first rotating knob 5 in a state where the pressing knob 7 can reciprocate and the rotation is restrained. The rotating detection part (the first contact pattern 15) and the pressing detection part (the driven part 16a and the push switch 16) are provided on one main surface of the circuit board 4, which faces the distal end side of the cylindrical lever body 2. Then, the rotating operation with respect to the first rotating knob 5 is detected by the rotating detection part and the pressing operation with respect to the pressing knob 7 is detected by the pressing detection part. Therefore, it is possible to provide the in-vehicle lever switch device which has anis excellent design. In addition, if one holder 3 rotatably supporting the first rotating knob 5 is assembled in the cylindrical lever body 2, the pressing knob 7 is also supported at a predetermined position. If the circuit board 4 is mounted on the holder 3, the main surface of the circuit board 4 on which the rotating detection part and the pressing detection part are provided can be caused to oppose the first rotating knob 5 or the pressing knob 7. Consequently, easy assembly and a less number of components may be realized, and the first rotating knob 5 and the pressing knob 7 are compactly aggregated in the vicinity of the distal end of the cylindrical lever body 2.

In addition, in the in-vehicle lever switch device 1, if the holder 3 on which the first and second rotating knobs 5 and 6, or the circuit board 4 are mounted, is fitted into a pair of the lever bodies 21 and 22, and both of the lever bodies 21 and 22 are assembled, the cylindrical lever body 2 with the holder 3 can be assembled, and thereby both of the rotating knobs 5 and 6, the circuit board 4 and the pressing knob 7 are configured to be respectively arranged at a predetermined position. In other words, the first rotating knob 5 is arranged at the position opposing one main surface 4a of the circuit board 4 and the slider 8 can be connected to and disconnected from the first contact pattern 15. The pressing knob 7 supported by the first rotating knob 5 is also arranged at the position opposing the main surface 4a and the distal end portion of the drive rod 7a is arranged at the position capable of thrusting the driven part 16a of the push switch 16. In addition, the second rotating knob 6 is arranged at the position opposing the other main surface 4b of the circuit board 4 and the slider 10 can be connected to and disconnected from the second contact pattern 17. Therefore, in this lever switch device 1, easy assembly and a less number of components, and cost reduction may be easily achieved.

Furthermore, in the present embodiment, by providing the contact patterns 15 and 17 which the sliders 8 and 10 can be connected to and disconnected from, on both main surfaces 4a and 4b of the circuit board 4, the rotating operation (rotating operation direction or rotation angle) with respect to the first rotating knob 5 or the second rotating knob 6 can be detected. Accordingly, the structure of the rotating detection mechanism is simplified and detection accuracy is also easily ensured. However, it is also possible to substitute the rotating detection mechanism with a rotary encoder and the like.

In addition, in this in-vehicle lever switch device 1, the drive rod 7a of the pressing knob 7 penetrates the first rotating knob 5 and is extended so as to overlap with the center line of rotation. And then, the drive rod 7a is arranged at the position where the distal end portion thereof can thrust the driven part 16a of the push switch 16. Therefore, even if the first rotating knob 5 is operated to rotate, there is no possibility that the distal end portion of the drive rod 7a may be deviated from the position where the driven part 16a of the push switch 16 can be thrust. In other words, although the cross-sectional shape of the first rotating knob 5 or the pressing knob 7 is configured to be non-circular in view of enhancing the design, the pressing knob 7 is capable of the pressing operation regardless of the position of the rotating operation of the first rotating knob 5. Therefore, usability of the pressing knob 7 may be improved without being limited to undesired usage.

In addition, in this in-vehicle lever switch device 1, the rubber body 12 with a dome shape is incorporated into the first rotating knob 5, the rubber body 12 is elastically buckled to impart a feeling of a click during the pressing operation with respect to the pressing knob 7. Therefore, the user is enabled to realize whether the pressing operation is reliably performed or not, using the presence of the feeling of a click, and the pressing knob 7 after the pressing operation can be caused to automatically return to its original position by the elastic restoring force of the rubber body 12. Consequently, the pressing operation with good operability can be performed.

Furthermore, in the above-described embodiment, the engaging/disengaging member 9 held by the holder 3 is brought into elastic contact with the cam surface 5e of the first rotating knob 5 and the engaging/disengaging member 11 held by the second rotating knob 6 is brought into elastic contact with the cam surface 3e of the holder 3. In this manner, the first rotating knob 5 or the second rotating knob 6 can be positioned and held at the position of the respective rotating operations, and the feeling of a click can also be imparted. However, it may be a configuration where the relations between the cam surfaces and the engaging/disengaging members are reversed. That is, the engaging/disengaging member held by the first rotating knob 5 may be brought into elastic contact with the cam surface of the holder 3 and the engaging/disengaging member held by the holder 3 may be brought into elastic contact with the cam surface of the second rotating knob 6.

In addition, in the above-described embodiment, the lever switch device having the second rotating knob 6 in the vicinity of the distal end of the cylindrical lever body 2 has been described, but it may be configured to omit the second rotating knob 6.

It should be understood by those skilled in the art that various modifications, combinations, sub-combinations and alterations may occur depending on design requirements and other factors insofar as they are within the scope of the appended claims of the equivalents thereof.

What is claimed is:

1. An in-vehicle lever switch device,
wherein in the vicinity of the distal end of cylindrical lever body, a rotating knob that can be rotated along an plane which is orthogonal to the axial direction of the cylindrical lever body and a pressing knob that can reciprocate along the axial direction by being loosely fitted to the rotating knob are arranged,
wherein the outlines along the orthogonal plane of the cylindrical lever body, the rotating knob and the pressing knob are non-circular,
wherein a holder incorporated in and fixed to the cylindrical lever body and a circuit board mounted on a holder in a posture along the orthogonal plane are provided,
wherein the rotating knob is rotatably supported by the holder and the pressing knob is supported by the rotating knob in a state where the pressing knob can reciprocate and the rotation is restrained, and
wherein a rotating detection part and a pressing detection part are provided on one main surface of the circuit board, which faces the distal end side of the cylindrical lever body, such that a rotating operation with respect to the rotating knob is detected by the rotating detection part and a pressing operation with respect to the pressing knob is detected by the pressing detection part.

2. The in-vehicle lever switch device according to claim 1,
wherein a push switch having a driven part is mounted on the circuit board as the pressing detection part,
wherein a drive rod extending and overlapping with the rotation center line of the rotating knob is installed to protrude in the pressing knob, and
wherein the drive rod is arranged at a position where the drive rod can penetrate the rotating knob and can thrust the driven part.

3. The in-vehicle lever switch device according to claim 1,
wherein a rubber body with a dome shape which elastically urges the pressing knob in the direction opposite to the pressing operation direction is incorporated in the rotating knob, and
wherein the rubber body is elastically buckled to impart a feeling of a click during the pressing operation with respect to the pressing knob.

4. The in-vehicle lever switch device according to claim 1,
wherein a contact pattern is provided on the circuit board as the rotating detection part, and
wherein a movable contact which is slidable with respect to the contact pattern is attached to the rotating knob.

5. The in-vehicle lever switch device according to claim 1,
wherein a cam surface is disposed at any one side of the holder and the rotating knob, and
wherein a storing part is disposed at the other one side in order to hold a engaging/disengaging member which comes into elastic contact with the cam surface.

* * * * *